(12) United States Patent
Hikichi

(10) Patent No.: US 6,475,614 B2
(45) Date of Patent: Nov. 5, 2002

(54) FRICTION MATERIAL

(75) Inventor: Akihiro Hikichi, Tokyo (JP)

(73) Assignee: Akebono Brake Industry Co., Ltd., Tokyo (JP)

(*) Notice: Subject to any disclaimer, the term of this patent is extended or adjusted under 35 U.S.C. 154(b) by 31 days.

(21) Appl. No.: 09/739,291

(22) Filed: Dec. 19, 2000

(65) Prior Publication Data

US 2001/0005547 A1 Jun. 28, 2001

(30) Foreign Application Priority Data

Dec. 20, 1999 (JP) .......................................... 11-321163

(51) Int. Cl.$^7$ ............................................... B32B 15/04

(52) U.S. Cl. ....................... 428/332; 428/323; 428/328; 428/333; 428/293.4; 524/496; 524/497; 523/156; 523/157; 523/149; 523/152

(58) Field of Search .................................. 524/496, 497; 428/297.4, 323, 328, 332, 333, 293.4; 523/153, 149, 150, 152, 155, 156, 157

(56) References Cited

U.S. PATENT DOCUMENTS 5,965,658 A * 10/1999 Smith et al. ................. 524/496
6,284,815 B1 * 9/2001 Sasahara et al. ............ 523/149

\* cited by examiner

*Primary Examiner*—Merrick Dixon
(74) *Attorney, Agent, or Firm*—Finnegan, Henderson, Farabow, Garrett & Dunner LLP

(57) ABSTRACT

In a friction material including a fibrous reinforcement, a friction modifier and a binder, no whisker-like potassium titanate fiber is contained, but powdery or flaky potassium titanate with an aspect ratio of not higher than 3 is mixed as a friction component. The diameter of the powdery or flaky potassium titanate is preferably in a range of from 0.05 $\mu$m to 150 $\mu$m. In addition, the powdery or flaky potassium titanate is preferably subjected to surface treatment with a silane coupling agent, phenolic resin, or the like. Further, fibrous potassium titanate may be mixed at a volume ratio of not higher than 30% with respect to the powdery or flaky potassium titanate. The fibrous potassium titanate is a by-product when the powdery or flaky potassium titanate is produced and which has a length of not longer than 5 $\mu$m or a diameter of not smaller than 3 $\mu$m.

4 Claims, No Drawings

FRICTION MATERIAL

BACKGROUND OF THE INVENTION

1. Field of the Invention

The present invention relates to a friction material, particularly relates to a friction material for an industrial machine, a railway vehicle, a baggage car, a passenger car, or the like, and more specifically relates to a friction material in a brake pad, a brake lining, a clutch facing, or the like, for use in the above-mentioned applications.

2. Description of the Related Art

In a friction material to be used mainly in a brake pad or the like, a fibrous reinforcement is used as one of materials for enhancing the strength of the friction material. Fibrous reinforcements used in place of asbestos fiber include glass fiber, steel fiber, aramid fiber, potassium titanate fiber, etc. Since these fibrous reinforcements have their own properties respectively, a mixture of several kinds of them is used.

Of these fibrous reinforcements, potassium titanate fiber is rated highly, as abrasive hard inorganic fiber, in the point that not only can it improve the strength, the heat resistance and the wear resistance of the friction material as a whole, but also it can enhance the friction coefficient of the friction material by its abrasive property, and particularly it can ensure a high friction coefficient at the time of a high load such as high-speed braking or the like.

However, potassium titanate fiber which has been used as alternative fiber to asbestos is composed of a needle-like single crystal having a diameter in a range of from 0.2 to 1 $\mu$m and a length in a range of from 10 to 20 $\mu$m, which is referred to as "whisker". It is therefore undesirable on the working environment and sanitation to use such potassium titanate fiber.

SUMMARY OF THE INVENTION

It is therefore an object of the present invention to provide a friction material which uses no whisker-like potassium titanate fiber undesirable on the working environment and sanitation, but provides friction performance and strength equal to those with such whisker-like potassium titanate fiber while restraining the manufacturing cost from increasing.

In order to solve the foregoing problem, the present inventors carried out various researches on material qualities and forms of inorganic substances which use no whisker-like potassium titanate fiber undesirable on the working environment and sanitation, but provide friction performance and strength equal to those with such whisker-like potassium titanate fiber.

Thus, the present invention was developed taking account of the fact that, when powdery or flaky potassium titanate, which was no less potassium titanate than such whisker-like potassium titanate, was used, friction performance and strength equal to those with such whisker-like potassium titanate could be obtained.

That is, the present invention solved the foregoing problem by the following means.

(1) A friction material composed of a fibrous reinforcement, a friction modifier and a binder, wherein powdery or flaky potassium titanate with an aspect ratio of not higher than 3 is mixed as a friction material component.

(2) A friction material defined in the above item (1), wherein a diameter of the powdery or flaky potassium titanate is in a range of from 0.05 $\mu$m to 150 $\mu$m.

(3) A friction material defined in the above item (1) or (2), wherein fibrous potassium titanate which is a by-product when the powdery or flaky potassium titanate is produced and which has a length of not longer than 5 $\mu$m or a diameter of not smaller than 3 $\mu$m is mixed at a volume ratio of not higher than 30% with respect to the powdery or flaky potassium titanate.

(4) A friction material defined in any one of the above items (1) to (3), wherein the powdery or flaky potassium titanate is subjected to surface treatment with a silane coupling agent, phenolic resin, or the like.

DETAILED DESCRIPTION OF THE PREFERRED EMBODIMENTS

A friction material is composed of a fibrous reinforcement, a friction modifier, a binder, etc. According to the present invention, whisker-like potassium titanate fiber, to say nothing of asbestos fiber, is not used as a fibrous reinforcement because it is not preferable for the sanitation and the working environment. However, powdery or flaky substances of potassium titanate having the same quality of material as the whisker-like potassium titanate fiber are used in place of the latter. The powdery substances may include not only absolutely round particles but also particles having a certain aspect ratio.

The powdery or flaky substances of potassium titanium used in the present invention may be manufactured particularly without requiring any industrial purified titanium oxide having high purity as titanium oxide for starting material, but may be manufactured with titanium oxide having general industrial purity in the condition and process of a burning method, a KDC method, a fluxing method, a melting method, or the like. The examples of the chemical compositions of the powdery or flaky substances include potassium octatitanate ($K_2O.8TiO_2$), potassium hexatitanate ($K_2O.6TiO_2$), potassium tetratitanate ($K_2O.4TiO_2$), and so on. Particularly, it is preferable to use any one of the former two. It is more preferable to use potassium octatitanate.

The powdery or flaky substances need to have an aspect ratio of not higher than 3. If the aspect ratio is higher than 3, the substances have a property close to fiber rather than close to powder so that there is a fear of a problem on the working environment and sanitation. It is therefore necessary to avoid using such fibrous substances. Diameters of the powdery or flaky substances are preferably in a range of from 0.05 $\mu$m to 150 $\mu$m. On the other hand, fibrous substances of potassium titanium having a length of not longer than 5 $\mu$m or a diameter of not smaller than 3 $\mu$m are produced as by-product when the powdery or flaky substances are produced. Such fibrous substances may be contained up to 30% of the powdery substances in volume ratio.

The loading of the powdery or flaky substances in the friction material is set to be in a range of from 0.5 wt % to 30 wt % of the whole of the friction material. If the loading is smaller than 0.5 wt %, it is difficult to disperse the substances uniformly in the friction material when they are mixed and stirred. Accordingly, a desired effect cannot be obtained. On the contrary, if the loading is larger than 30 wt %, though the effect is enhanced, the wear resistance property deteriorates. Therefore, the loading is set to be not larger than 30 wt %. Preferably the loading is set to be in a range of from 5 wt % to 15 wt %.

In addition, the powdery or flaky substances are preferably subjected to surface treatment with a silane coupling agent or phenolic resin. The substances subjected to such surface treatment have an advantage that they can be easily mixed with other materials when a friction material is manufactured, so that the strength of a heat-molded product is increased. The loading of the silane coupling agent or phenolic resin is preferably set to be in a range of from 0.3 wt % to 5 wt % with respect to the powdery or flaky substances.

In consideration of economy in the grinding process in which the powdery or flaky substances are produced by grinding the aforementioned whiskers, the fibrous substances of potassium titanium having a length of not longer than 5 μm or a diameter of not smaller than 3 μm are produced as by-product at a volume ratio of not higher than 30% when the powdery or flaky substances are produced. From the point of view of the grinding efficiency, the volume ratio of the fibrous substances to the powdery or flaky substances has a lower limit at about 10%. If the volume ratio is lower than 10%, the production cost of the powdery or flaky substances increases uneconomically.

Conventionally, as a kind of friction modifier, metal oxide such as alumina, magnesia, or the like, is generally added to a friction material. According to the present invention, such a friction modifier may be used together with the above-mentioned powdery or flaky substances. Not to say, an aimed effect can be obtained even if only the powdery or flaky substances are used.

To produce a friction material according to the present invention, the above-mentioned powdery or flaky substances as raw materials are mixed with a friction material composed of a fibrous reinforcement, a friction modifier, a lubricant and a binder, and the mixture is preformed and then heat-molded in an ordinary producing process.

Examples of the fibrous reinforcements in the friction material according to the present invention may include organic fiber such as aromatic polyamide fiber, fire-resistant acrylic fiber, or the like; and metal fiber such as copper fiber, steel fiber, or the like.

Examples of the inorganic fillers may include metal particles of copper, aluminum, zinc, or the like; flake minerals such as vermiculite, mica, or the like; barium sulfate or calcium carbonate; or the like.

Examples of the binders may include thermosetting resin such as phenolic resin (including straight phenolic resin, and various phenolic resin modified with rubber or the like), melamine resin, epoxy resin, polyimide resin, etc.

Examples of the friction modifiers may include inorganic friction modifiers such as alumina, silica, magnesia, zirconia, chrome oxide, quartz, etc.; and organic friction modifiers such as synthetic rubber, cashew dust, etc. Examples of solid lubricants may include graphite, molybdenum disulfide, etc.

The friction material may take a variety of compounding ratios as its composition.

That is, one or more kinds of these raw materials may be selected and mixed in accordance with the friction properties required for products, for example, the friction coefficient, the wear resistance, the vibration property, the friction noise, etc.

A process for manufacturing a brake pad is carried out as follows. A pressure plate is formed into a predetermined shape by sheet metal pressing, subjected to degreasing and primer processing, and coated with an adhesive agent. Fibrous reinforcements of heat-resistant organic fiber, metal fiber, or the like, are mixed with powdered raw materials of organic and inorganic fillers, a friction modifier, a thermosetting resin binder, and so on, and then sufficiently homogenized by stirring. The sufficiently homogenized raw materials are molded (preformed) at room temperature and under predetermined pressure so that a preformed friction material is produced. The pressure plate and the preformed friction material are heat-molded at predetermined temperature and under predetermined pressure in a heat-molding process so as to be fixed integrally with each other. The integrated friction material is after-cured and finally subjected to finishing. This manufacturing process is the same as that in a conventional method.

The present invention will be described specifically on the basis of the following examples. However, the present invention is not limited only to these examples.

EXAMPLES (Materials of friction material samples)

The following materials were used as the materials of the friction material when samples of friction materials were produced. In producing the samples, materials were selected from the following materials and their mixture was changed in every sample.

Binder:

phenolic resin
Organic friction modifier:

cashew dust
Filler:

barium sulfate (powder, average particle size 8 μm)
Abrasive zirconia (powder, average particle size 11 μm)
Solid lubricant:

graphite (powder, average particle size 60 μm)
Fibrous reinforcement:

copper fiber (fiber diameter 90 μm)/aramid fiber (fiber diameter 13.5 μm)/ceramics fiber (alumina-silica fiber, fiber length 700 μm, fiber diameter 2.8 μm)
Abrasive:

potassium octatitanate powder subjected to various or no surface treatment

Then, as the potassium titanate, powdery potassium titanate having an average length of 4 μm, an average diameter of 2 μm and an aspect ratio of 2 was used. Incidentally, the aforementioned fibrous substances (fibers having a length of not larger than 5 μm or a diameter of not smaller than 3 μm) having no environmental or sanitary problem contained 10 wt % (at a powder-to-fiber weight ratio of 9:1) in the powdery potassium titanate. In First Table, the upper row of the section of potassium titanate powder designates by-product fiber by wt % while the lower row designates powder by wt %. (Compositions of the friction material samples)

Compositions having mixture ratios shown in the following First Table were used respectively for producing samples of friction materials. Thus, Samples of Examples 1 and 2 were prepared.

Incidentally, for the sake of comparison, samples using potassium octatitanate whiskers were prepared (Comparative Example 1).

(Producing brake pads)

Brake pads having the samples of friction materials with the above-mentioned compositions were produced by a conventional producing method.

TABLE 1

| Component (wt %) | Comparative Example 1 | Example 1 | Example 2 |
|---|---|---|---|
| Phenolic resin | 10 | 10 | 10 |
| Cashew Dust | 10 | 10 | 10 |
| Barium Sulfate | 45 | 45 | 45 |
| Zirconia | 2 | 2 | 2 |
| Graphite | 8 | 8 | 8 |
| Copper Fiber/Aramid Fiber | 10/5 | 10/5 | 10/5 |
| Ceramics Fiber | 5 | 5 | 5 |
| Potassium Titanate Fiber | 5 | — | — |
| Potassium Titanate Powder | — | 0.5 | — |
|  | — | 4.5 | — |
| Potassium Titanate Powder (treated with amino silane) | — | — | 0.5 |
|  | — | — | 4.5 |

(Examination method)

The following examinations were performed with a disc brake using a rotor.

(1) JASO effectiveness evaluation

The JASO effectiveness evaluation of the friction coefficient was performed on the conditions of an initial speed of 50 km/h or 100 km/h and a deceleration $\alpha=5.88$ m/s$^2$.

(2) JASO first-fade minimum $\mu$ (3) Friction noise test with a vehicle (4) Rotor aggression (using a test piece as brake pad)

Wear of the rotor per 1,000 times, speed of 50 km/h, deceleration $\alpha=0.98$ m/s$^2$, and temperature of 100° C.

(5) Brake pad wear

Wear of the brake pad per 1,000 times, speed of 50 km/h, deceleration $\alpha=2.94$ m/s$^2$, and temperature of 100° C., 200° C. and 400° C.

(Examination results)

The results of the examinations are shown in Second Table.

TABLE 2

|  |  | Comparative Example 1 | Example 1 | Example 2 |
|---|---|---|---|---|
| JASO Effectiveness | 50 km/h | 0.45 | 0.45 | 0.46 |
|  | 100 km/h | 0.40 | 0.42 | 0.41 |
| JASO 1st Fade | Minimum $\mu$ | 0.25 | 0.26 | 0.25 |
| JASO Wear Equivalent to 1,000 times (mm) | 100° C. | 0.08 | 0.09 | 0.09 |
|  | 200° C. | 0.18 | 0.20 | 0.19 |
|  | 400° C. | 0.76 | 0.80 | 0.78 |
| Friction Noise Test |  | None | None | None |
| Rotor Aggression ($\mu$m) |  | 5.8 | 5.7 | 5.5 |

According to the present invention, not by using whisker-like potassium titanate fiber but by using powdery or flaky substances which have the same composition as that in the whisker-like potassium titanate fiber, it is possible to obtain the same effects as those in the case where the whisker-like potassium titanate fiber is used. It is therefore possible to avoid a problem on the working environment and sanitation which may occur in the case where the whisker-like potassium titanate fiber is used. Nevertheless, a sufficient friction effect can be obtained.

Further, when the powdery or flaky substances of potassium titanate are subjected to surface treatment with a silane coupling agent, phenolic resin, or the like, the strength of a friction material can be enhanced. In addition, although by-product fibrous substances of potassium titanate are produced when the powdery or flaky substances are produced, the powdery or flaky substances may be used while being mixed with a small amount of such by-product fibrous substances which cause no problem on the working environment and sanitation. Thus, it is possible to restrain the manufacturing cost of the friction material from increasing.

What is claimed is:

1. A friction material comprising:

a fibrous reinforcement;

a friction modifier; and a binder, wherein one of powdery and flaky potassium titanate with an aspect ratio of not higher than 3 is mixed as a friction material component.

2. A friction material according to claim 1, wherein a diameter of said powdery and flaky potassium titanate are in a range of from 0.05 $\mu$m to 150 $\mu$m.

3. A friction material according to claim 1, further comprising fibrous potassium titanate being a by-product when said one of powdery and flaky potassium titanate is produced, wherein said fibrous potassium titanate has one of a length of not longer than 5 $\mu$m and a diameter of not smaller than 3 $\mu$m and is mixed at a volume ratio of not higher than 30% with respect to said one of powdery and flaky potassium titanate.

4. A friction material according to claims 1, wherein said one of powdery and flaky potassium titanate is subjected to surface treatment with at least one of a silane coupling agent and phenolic resin.

* * * * *